United States Patent [19]

Reichow

[11] 4,175,716
[45] Nov. 27, 1979

[54] AUTOMATIC SPIN CAST REEL

[76] Inventor: James R. Reichow, 2912 N. 82nd Cir., Brooklyn Park, Minn. 55444

[21] Appl. No.: 897,788

[22] Filed: Apr. 19, 1978

[51] Int. Cl.² ............................................. A01K 89/01
[52] U.S. Cl. .................................. 242/84.2 A; 43/20; 242/84.1 A; 242/84.2 F; 242/84.2 G
[58] Field of Search .................... 242/84.1 A, 84.2 A, 242/84.21 A, 84.21 R, 84.2 G, 84.2 F, 84.2 R; 43/21, 20

[56] References Cited

U.S. PATENT DOCUMENTS

| 3,075,722 | 1/1963 | Stealy et al. | 242/84.1 A |
| 3,348,788 | 10/1967 | Vinokur | 242/84.1 A X |
| 3,459,387 | 8/1969 | Miyamae | 242/84.1 A X |

Primary Examiner—Billy S. Taylor
Attorney, Agent, or Firm—Williamson, Bains, Moore & Hansen

[57] ABSTRACT

The device of the invention utilizes an adjustably positionable mercury switch to actuate a solenoid which in turn releases the line on the spinning reel in response to the reel reaching a predetermined angle or position in the casting motion. This feature allows the line to be consistently released at the proper position in order to achieve the desired length of cast.

9 Claims, 9 Drawing Figures

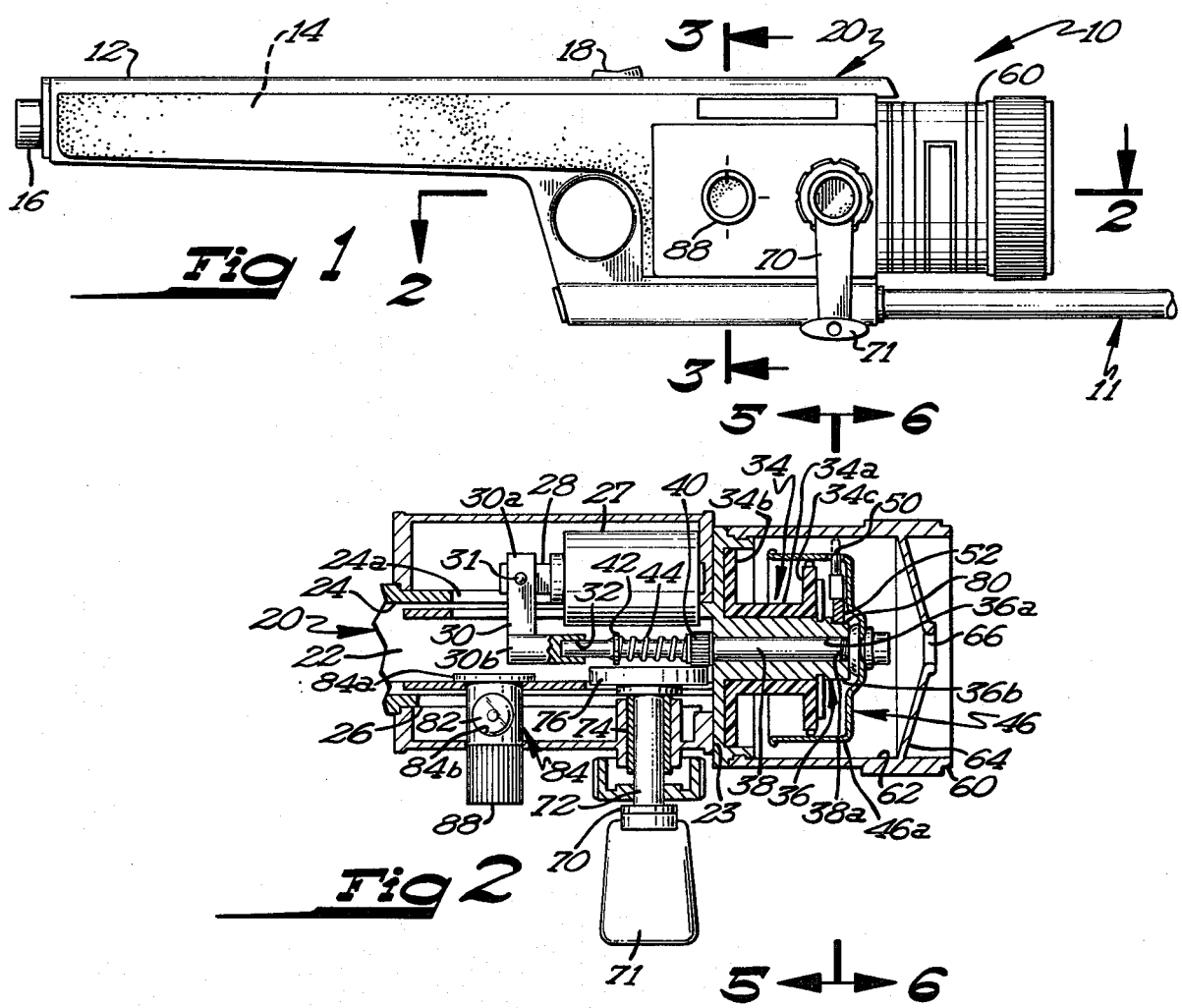
Fig 1
Fig 2
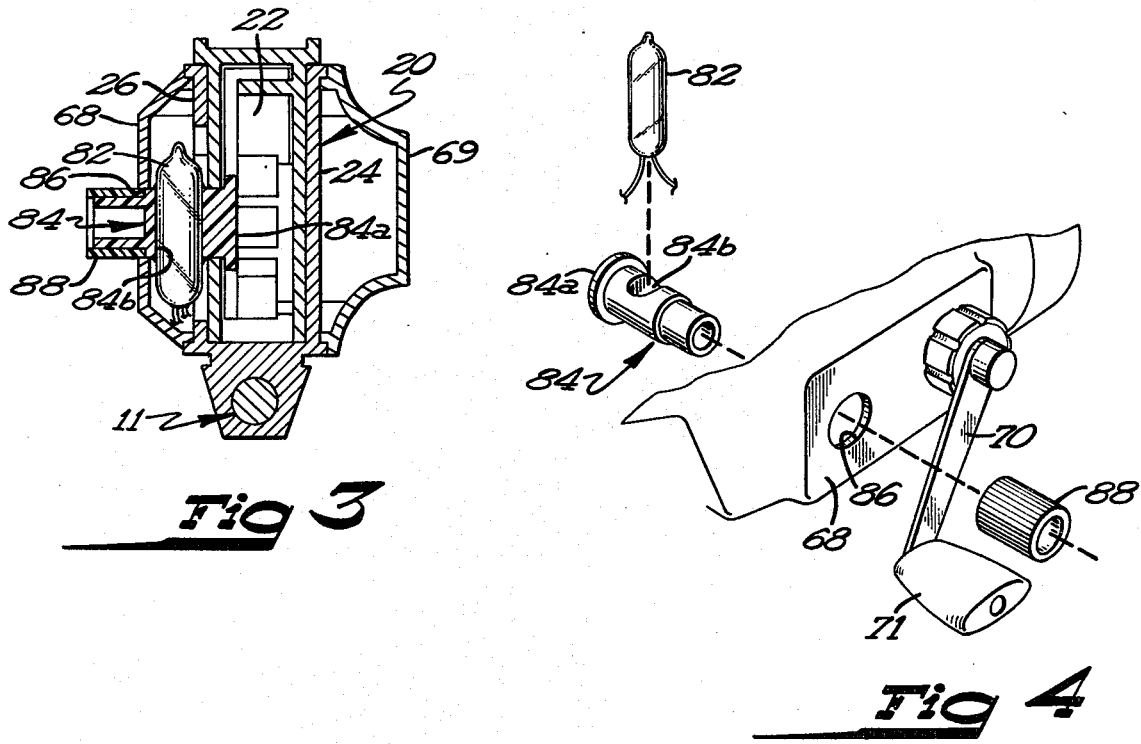
Fig 3
Fig 4

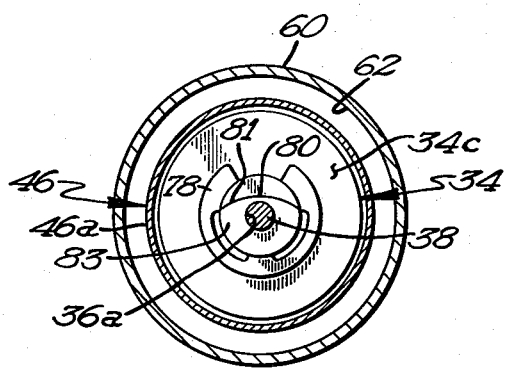
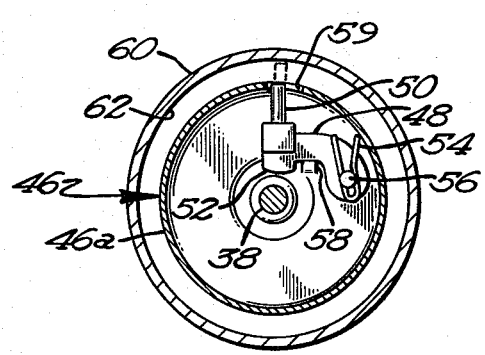
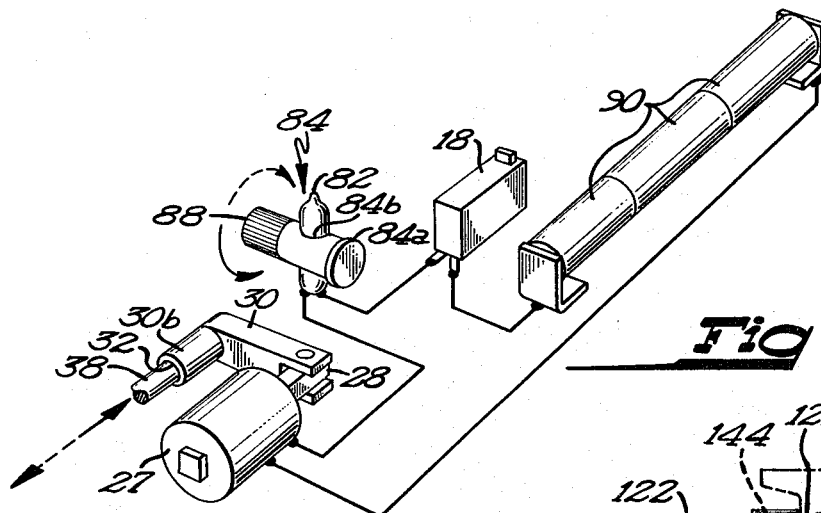
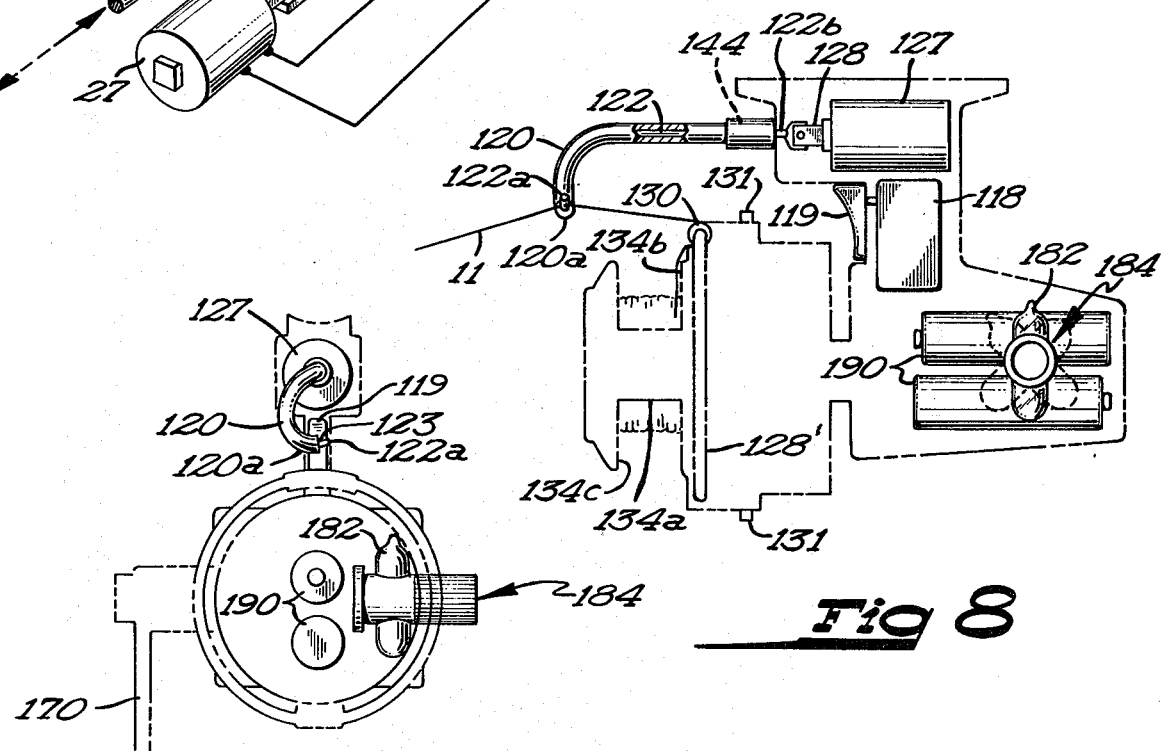

AUTOMATIC SPIN CAST REEL

BACKGROUND OF THE INVENTION

In recent years spin casting reels have become increasingly popular with fisherman. Typical of the prior art reels are those which utilize a thumb operated button or other similar catch to release the reel so that the cast may be made. In operating such a device the fisherman is faced with the problem of actuating the catch at the proper moment during the cast. Should he release the catch too soon the line will go straight up in the air and should he release it too late it will fall into the water at his feet, neither of which is desirable.

It is therefore an object of the instant invention to provide an automatic spin casting reel which will act to cause the reel to release at a predetermined angular position in the casting motion in order that a consistent, proper cast may be obtained. It is further an object of this invention to provide a device which may be easily utilized and adjusted by the fisherman as well as being inexpensive and easy to manufacture.

SUMMARY OF THE INVENTION

The invention comprises most particularly the provision of an automatic release mechanism used in conjunction with any of a number of conventional spinning or spin casting reels. Particularly, a mercury switch is rotatably mounted in the rod such that the rotational position may be varied in the plane in which casting takes place. The mercury switch is located in series with the power source, a solenoid, and a manually activatable switch such that when the switch is depressed at the beginning of the casting motion, upon the reel reaching the desired point in the casting motion, the mercury switch will be closed, thereby energizing the solenoid. The plunger of the solenoid then actuates the release mechanism of the spinning reel proper. The inventive feature may be utilized on any of a number of different types of spinning reel mechanisms, either of the open or closed-faced type. Thus the device of the instant invention may be manufactured using largely conventional mechanisms in the associated tooling yet providing the improved results noted above. An open-faced version may utilize a curved guide tube and plastic pickup which may hold the line until the solenoid is actuated.

DESCRIPTION OF THE DRAWING FIGURES

FIG. 1 is a right side plan view of the spin cast reel.

FIG. 2 is a sectional view taken along lines 2—2 of FIG. 1.

FIG. 3 is a sectional view taken along lines 3—3 of FIG. 1.

FIG. 4 is a perspective view showing particularly the orientation and mounting of the attitude sensitive mercury switch.

FIG. 5 is a sectional view taken along lines 5—5 of FIG. 1.

FIG. 6 is a sectional view taken along lines 6—6 of FIG. 1.

FIG. 7 is a wiring schematic of the instant invention.

FIG. 8 discloses an alternate embodiment of the instant invention utilizing an open-faced spin cast reel.

FIG. 9 is a further view of the open-faced embodiment.

DESCRIPTION OF THE PREFERRED EMBODIMENT

An automatic spin cast reel, generally 10, is provided with an elongated slender handle 12 having a cavity 14 therein for containing batteries (FIG. 7) and provided with a cap 16 at the end enclosing the battery cavity. Handle 12 is provided on top with a switch 18 the function of which will be described hereinafter. Handle 12 has formed at its end opposite from cap 16 a main body housing 20 which has mounted either therein or thereon the majority of the actuating mechanism. Housing 20 has formed therein a substantially rectangular cavity 22. Cavity 22 is formed by left side wall 24 and right side wall 26. Mounted on left-hand side wall 24 is straight line solenoid 27 the direction of travel of which is parallel to fishing rod 11 upon which the reel may be mounted and in general the longitudinal axis of the reel. The solenoid 27 is shown in its energized state in FIG. 2, that is, at the forward (right side of FIG. 2) end of its travel. When deenergized the solenoid 27 will be forced to return toward the handle (or rearward) end of the housing. Solenoid 27 has an output shaft 28 extending rearwardly and located thereon is an L-shaped motion direction changing piece 30 which serves to transfer the fore-aft motion of solenoid shaft 28 to the parallel axis of the spool 34. Direction changing piece 30 has a first end 30A which is fastened by a pin 31 to solenoid shaft 28, and a second end 30B having a bore located therein. Piece 30 extends through an aperture 24A in side wall 24 and the second leg portion 30B of piece 30 is located substantially coaxially with the remainder of the reel mechanism. Central cavity 22 is bounded at the right side of FIG. 2 by a front wall 23. Located on the front wall 23 is primarily a spool 34 having a cylindrical line-carrying surface 34A and inner and outer flanges 34B and 34C respectively. Inner flange 34B abuts front wall 23. A cylindrical extension 36 of front wall 23 extends through the bore of spool 34 and coaxial therewith. Spool 34 also mounts on and fits over the periphery 36B of extension 36 and a bore 36A is provided therein for passage of the rotor shaft 38. Cylinder 36 may be formed of a plastic suitable for low frictional, rotational mounting of shaft 38. One end of shaft 38 is mounted in bore 32 which is located in end 30B of motion transmitting piece 30. Shaft 38 has located thereon via a splined connection (not shown) a pinion gear 40 which acts to rotate shaft 38 yet may move longitudinally along shaft 38. Also located on shaft 38 is a small ring or C-clip 40 in a groove (not shown). Interposed about shaft 38 and located between pinion gear 40 and ring 42 is biasing spring 44. Since pinion gear 40 is located adjacent cavity front wall 23, spring 44 will always exert a biasing force on C-clip 40 and shaft 38 forcing it rearwardly as shown in FIG. 2 while maintaining pinion gear 40 against front wall 23. Threadably mounted on the end 38A of shaft 38 is winding cup 46. The threads tend to be tightened by rotation in the winding direction. Winding cup 46 has an open rim 46A which fits partially over spool 34 and encircles spool outer flange 34C.

As shown in FIG. 6 winding cup 46 has located therein a winding rocker 48 which is hingedly mounted at hinge 56 for pivotable movement thereabout. Also present on rocker 48 is cam follower surface 52 which is curved, and the operation of which will be explained hereinafter. Further, located on rocker 48 and facing radially outwardly is winding pin 50. Rocker 48 is biased in a radially inwardly direction by hairpin spring 54. Radially inward travel is limited by rocker stop 58 which is formed as a flange cut out of winding cup 46. A hole 59 is formed in the outer circumference 46A of winding cup 46 to allow winding pin 50 to extend therethrough. A spool cover 60 is also provided and fits via threads, a bayonet coupling, or similar means onto front wall 23 of the housing. The inner cylindrical surface 62 of cover 60 is so sized in conjunction with winding pin 50 that, when said winding pin 50 is extended outwardly as will be described hereinafter, there is a very small clearance between the outer portion of winding pin 50 and surface 62 such that fishing line cannot pass therebetween. A conical front wall 64 for said spool housing 60 is provided either integrally or attached to housing 60 and allows for the pay-out of line through pay-out aperture 66.

A right side housing 68 and left side housing 69 are provided in order to house additional portions of the device. First of all for winding, a crank handle 70 is mounted upon crank shaft 72 which is provided with a bushing 74 in right side cover 68 for rotation therein. Fixedly located at the end of shaft 72 is crown gear 76 which engages with pinion gear 40 for rotation of the winding shaft 38. A knob 71 may be provided at the end of handle 70 to aid in winding.

FIG. 5 shows spool 34 as held upon piece 36 and against front wall 23 by means of a C-ring 78 which is located in a circumferential slot 36C upon cylindrical extension 36. Located at the end of member 36 is a camming surface 80 the function of which will be described hereinafter.

As shown more particularly in FIGS. 2, 3 and 4, a common mercury switch as is well-known in the art and designated 82 is mounted in a switch carrier 84. Switch carrier 84 is rotatably mounted via flange 84A at its inner end in main housing right side 26 and at the other end by rotatably extending through a hole 86 in right side cover 68. A knob 88 is attached to carrier 84 so that the fisherman may rotate the switch carrier 84 and also mercury switch 82 to the desired position in order that he may vary the angle of activation. Switch 82 is located in a hole 84B which is transverse to the rotational axis of switch carrier 84.

FIG. 7 discloses a simple schematic of the electrical circuitry in the device. Microswitch 18 is manually activatable by the user and is located on the top of handle 12 as described previously. Located in series therewith are also batteries 90 (any other well-known power source may also be provided), solenoid 27 and mercury switch 82. Mercury switch 82 will close and provide a completed circuit when oriented in the particular predetermined position that has been selected. Thus in order to provide a completed circuit and energize solenoid 27, both mercury switch 82 and manual switch 18 must be closed. Desirably this will happen only in a casting motion as will be more fully described hereinafter.

While a particular type of spin cast reel mechanism has been shown, it may be appreciated that any of a number of types may be utilized wherein the output shaft of the solenoid is used to actuate the mechanism normally actuated by the fisherman's thumb or finger.

FIGS. 8 and 9 disclose an alternative embodiment of the inventive concept as applied to an open-faced type spinning reel. Such an embodiment may utilize any common open-faced reel and comprises primarily the addition of the actuation circuit and mechanism shown in FIG. 7 to a conventional reel. Specifically, the mechanism shown in phantom in FIGS. 8 and 9 represents the conventional type of open-faced reel. Additionally, a curved guide tube 120 is provided and extends axially along the same direction as the fishing rod and is provided with a curved end portion 120A perpendicular to that axis. Located therein is a pickup piece 122 which may telescope within guide tube 120. The inner end 122B of the pickup is fastened to the output shaft 128 of solenoid 127. A spring 144 biases pickup 122 outwardly into the position shown in FIG. 9. The fishing line 11 while waiting to be actuated assumes the position shown in FIG. 9 and lies in the crook 123 between the tip 122A of pickup 122 and the curved end portion 120A of guide tube 120. Upon actuation of switch 118 by trigger 119 and the rod and mercury switch 182 passing through the desired position, the circuit will be completed and the tip 122A of pickup 122 will be pulled flush with the end of guide tube 120 thereby allowing the fishing line 11 to freely unreel. As with the closed-faced device, a mercury switch carrier 184 is provided in a similar manner and is rotatably mounted for adjustment of release position, and batteries 190 are also provided.

In reference to the several parts of the conventional open face reel, bail 128' has line winding point 130 at one end thereof. Bail 128' pivots about pivot points 131 (also shown in phantom). The spool of the reel is designated by cylindrical portion 134A and inner and outer flanges 134B and 134C, respectfully.

It is to be appreciated that the concept as embodied in the above open and closed-faced versions may be suited to use in a kit which may be added to existing reels as well as for integral manufacture of new units.

OPERATION OF THE INVENTION

Before the device is utilized, it will generally be in a nonenergized or winding mode (position). In that position solenoid 27 is not energized and spring 44 forces shaft 38 to its most rearward position, that is, somewhat to the left of the position shown in FIG. 2. When in that position, cam follower 52 rests upon the outer surface 81 of member 36 thereby causing winding pin 50 to extend through hole 59 of winding cup 46. When in such a position, the line (not shown) cannot unwind freely but instead will come to a stop against pin 50. At this point, by turning handle 70, line may be wound about spool 34 at the convenience of the fisherman.

When the fisherman desires to make a cast, he brings the rod back over his shoulder as he would with a normal apparatus. At this point he presses switch 18 located in handle 12 thereby partially completing the circuit shown in FIG. 7. At this point the fisherman starts his normal casting motion. The casting plane is that which the rod-reel combination is in during the casting motion and is the same as the picture plane of FIG. 1. During casting, the rod-reel assembly rotates about an axis parallel to the axis of rotation of switch holder 84. These rotational axes are in general perpendicular to the casting plane. Upon reaching a predetermined position (selected by rotation of knob 88) the mercury inside mercury switch 82 will complete the circuit thereby energizing solenoid 27. Energization of solenoid 27 causes solenoid shaft 28 to move to the right of FIG. 2 thereby transmitting motion through piece 30 and forcing shaft 38 forward in device 10. As shaft 38 moves forward, of course, winding cup 46 moves therewith. When winding cup 46 has moved far enough so that cam follower 52 is completely forward and clear of camming surfaces 80 and 81, spring 54 will force cam follower 52 radially inwardly thus withdrawing winding pin 50 to the position shown in FIG. 6. The inward motion of follower 52 will be halted by rocker stop 58. At this point the fishing line is free to unreel from the spool since the pin no longer restrains the line from unreeling. Thus, at this point, the line unreels as would take place in a conventional cast. Upon completion of the cast, the fisherman releases switch 18 thereby deenergizing the circuit and the solenoid.

In order to reel the line in then, the fisherman need merely turn handle 70 as he would in any normal device. At this point stop 58 has held rocker arm 48 in a position such that cam follower 52 is located an equal distance away from the axis of shaft 38 as the minimum diameter of camming surface 80 (as shown in FIG. 5). Since the solenoid 27 has been deenergized, spring 44 will exert a strong biasing force on shaft 38 urging it to the rear as shown in FIG. 2. When the fisherman has rotated shaft 38 such that the lowest portion of camming surface 80 coincides with cam follower 52, the shaft 38 and winding cup 46 will move slightly rearward and assume the position as shown in FIG. 2 with cam follower 52 riding on the smallest diameter portion of camming surface 80. As the fisherman then turns handle 70 further, cam follower 52 will follow camming surface 80 thereby lifting rocker 48 radially outwardly and extending winding pin 50 through aperture 59 in the winding cup. Upon cam follower 52 reaching the outer diameter 81, spring 44 will then force shaft 38 farther rearwardly and winding pin 50 will be completely raised such that there is the aforementioned minimal clearance between it and cover 62. At this point the line is no longer free to unreel, and indeed, further winding of handle 70 will cause winding pin 50 to coil the line around spool 34. As can be appreciated mercury switch 82 may be adjusted via knob 88 in order to vary the point at which solenoid energization and casting takes place according to the desires of the fisherman. It can be appreciated that he may want to either maximize the distance of the cast or cut down on such a distance while using a consistent casting motion for the various distances.

While the preferred embodiments of the present invention have been described, it should be understood that various changes, adaptations and modifications may be made therein without departing from the spirit of the invention and the scope of the appended claims.

What is claimed is:

1. An automatic cast fishing reel comprising;
a spool for windably storing fishing line,
means for winding fishing line upon said spool,
said winding means being moveable between a winding position such that the fishing line may be wound upon said spool and a casting position whereby the line is free to unwind during a cast, said winding means being normally in said winding position; and
switching means for moving said winding means between said winding position and said casting position, said switching means being sensitive to the angular orientation of said reel and operative upon movement of said reel to a predetermined angular position relative to the horizontal during casting to move said winding means from said winding position to said casting position to free line for casting, and at least part of said switch means being rotatably mounted to said reel and such that it may be rotated relative to said reel in the plane in which casting takes place in order to adjust said predetermined angle.

2. The automatic cast fishing reel of claim 1 wherein said switching means comprises a position sensitive switch and a manually activatable switch connected in series so that said switching means will operate only when said manual switch is activated and when said position sensitive switch reaches said predetermined angular position.

3. The automatic cast fishing reel of claim 2 wherein said position sensitive switch is a mercury switch.

4. The automatic cast fishing reel of claim 2 wherein said switching means further comprises a solenoid connected to said winding means and to said position sensitive switch whereby when the reel reaches said predetermined angular position, said position sensitive switch will energize said solenoid and said solenoid will move said winding means to said casting position.

5. The automatic cast fishing reel of claim 4 wherein said winding means comprises a spin casting reel having a shaft which winds fishing line when rotated and which when moved axially will shift to said casting position, said solenoid being connected to said shaft.

6. The automatic cast fishing reel of claim 3 wherein the axis of rotation of said mercury switch is perpendicular to said casting plane.

7. The automatic cast fishing reel of claim 4 wherein said winding means comprises:
an open-face spinning wheel,
a guide tube having a tip extending forward of said open-face reel,
a pickup having first and second ends, said pickup being telescopingly located in said guide tube, said pickup first end being connected to said solenoid whereby when said solenoid is not energized, said pickup second end extends beyond said guide tube tip a distance sufficient to engage the fishing line and prevent the line from unwinding, and whereby when said solenoid is energized, said pickup second end is withdrawn into said guide tube such that the fishing line is no longer engaged.

8. The automatic cast fishing reel of claim 5 wherein said winding means comprises:
a frame, said spool being fixed to the front of said frame and having a circumferential groove to receive line,
a cup member opening toward said spool and coaxial therwith and having peripheral flange overlapping the one end of the spool remote from said frame,
a radially projecting pin in said cup member biased toward an inner casting position of no projection beyond said cup member,
an eccentric cam fixedly mounted at said remote spool end and being operable upon rotation of said cup member to move said pin to and hold in an outer projecting position for winding,
said shaft being attached to said cup member whereby said pin will be moved to said outer position by said cam and line leading to said spool will be wound thereabout by said cup and said pin and whereby when said solenoid is energized, said cup will move said pin away from said cam so that said pin will move to said casting position so that the line is not restrained from unwinding.

9. An automatic cast fishing reel comprising:
a spool for windably storing fishing line, means for winding fishing line upon said spool, said winding means being moveable between a winding position such that the fishing line may be wound upon said spool and a casting position whereby the line is free to unwind during a cast, said winding means being normally in said winding position; and switching means for moving said winding means between said winding position and said casting position. said switching means being sensitive to the angular orientation of said reel and operative upon movement of said reel to a predetermined angular position relative to the horizontal during casting to move said winding means from said winding position to said casting position to free line for casting, said switching means comprising a position sensitive switch and a solenoid connected to said winding means and to said position sensitive switch whereby when the reel reaches said predetermined angular position, said position sensitive switch will energize said solenoid and said solenoid will move said winding means to said casting position.

* * * * *

UNITED STATES PATENT AND TRADEMARK OFFICE
CERTIFICATE OF CORRECTION

PATENT NO. : 4,175,716
DATED : November 27, 1979
INVENTOR(S) : James R. Reichow

It is certified that error appears in the above—identified patent and that said Letters Patent are hereby corrected as shown below:

Column 6, claim 7, line 3, Delete "wheel" and substitute --reel--.

Signed and Sealed this

Nineteenth Day of August 1980

[SEAL]

Attest:

SIDNEY A. DIAMOND

Attesting Officer    Commissioner of Patents and Trademarks